June 10, 1941. L. F. WOODRUFF 2,244,818
FASTENING DEVICE
Filed March 1, 1938 2 Sheets-Sheet 1
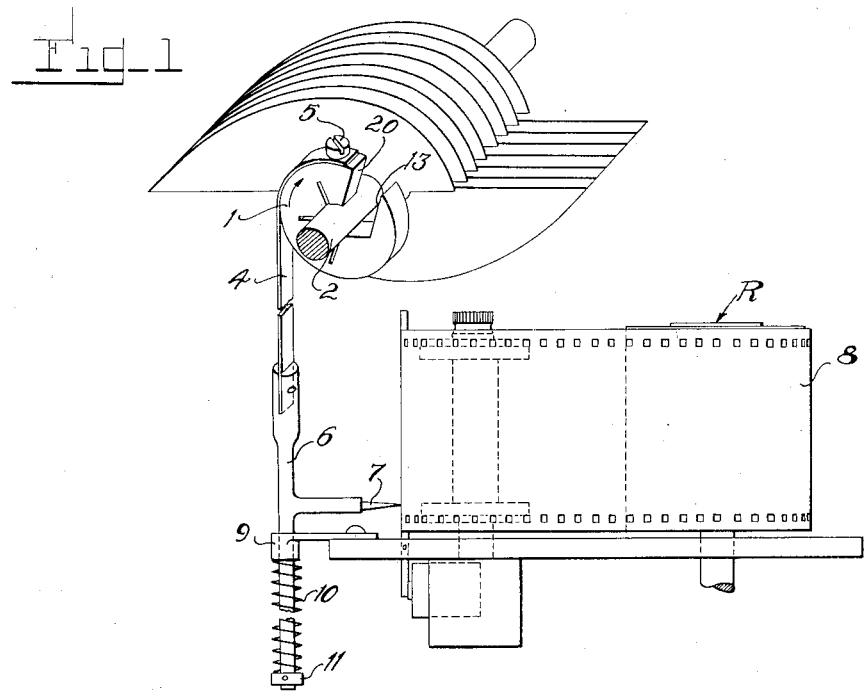
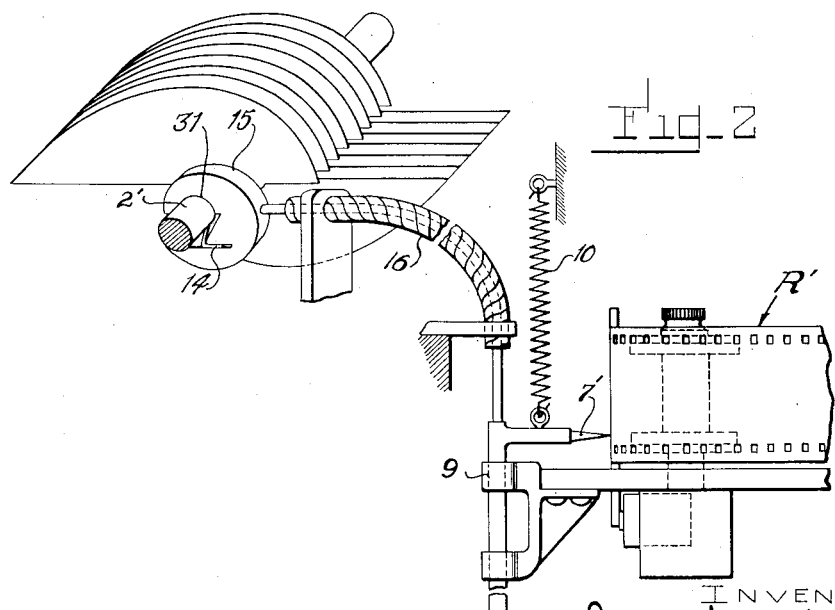
INVENTOR
Louis F. Woodruff
By Dike, Calver + Gray
Attys.

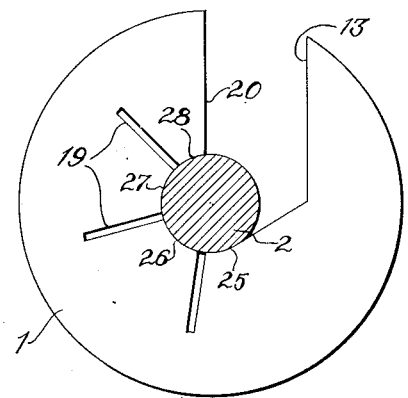
Fig_3
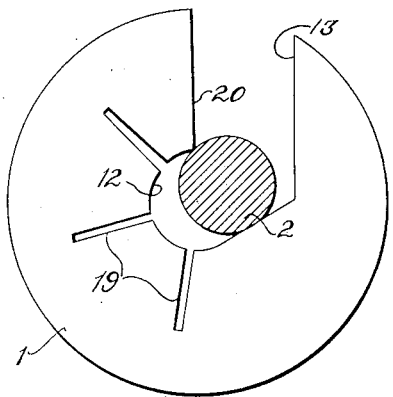
Fig_4
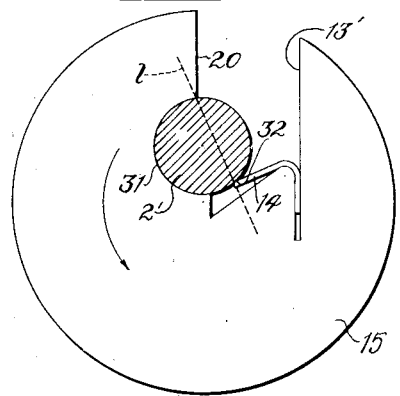
Fig_5
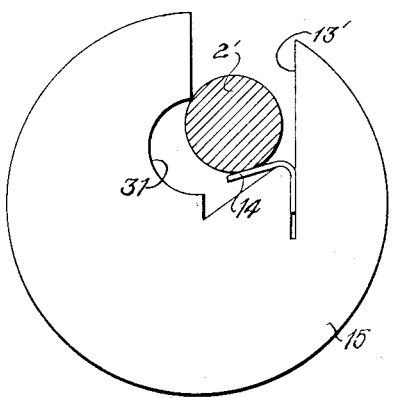
Fig_6
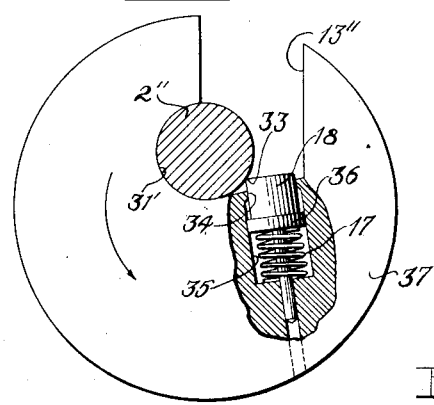
Fig_7
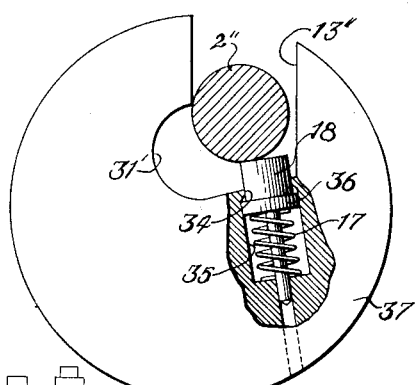
Fig_8

Patented June 10, 1941

2,244,818

UNITED STATES PATENT OFFICE 2,244,818

FASTENING DEVICE

Louis Frank Woodruff, Wellesley, Mass., assignor to A. C. Nielsen Company, Chicago, Ill., a corporation of Illinois Application March 1, 1938, Serial No. 193,272

2 Claims. (Cl. 287—52)

The present invention contemplates a simple clutch construction which can be embodied in any of various mechanical elements, such as cams, pulleys or the like, to permit the latter to be mounted easily and quickly in any desired position upon an arbor. For example, the clutch may be constructed to permit the mechanical element to be fastened upon the arbor merely by movement toward the arbor transversely thereof.

The invention will be more clearly understood from the following description in conjunction with the accompanying drawings: in which, Fig. 1 is a diagrammatic view of a recorder having a disk embodying the invention operatively connected to the condenser shaft of a radio receiving instrument;

Fig. 2 is a similar diagrammatic view of a recorder having a cam embodying another clutch construction operatively connected to the condenser shaft of a radio receiving instrument;

Figs. 3 and 4 are enlarged detail elevational views of the disk of Fig. 1 showing it mounted upon and detached from the condenser shaft respectively;

Figs. 5 and 6 are enlarged elevational views of the cam of Fig. 2 showing it mounted upon and detached from the condenser shaft respectively; and Figs. 7 and 8 are enlarged elevational views similar to Figs. 3 and 4, partly in section, of a disk embodying a clutch of modified construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is illustrated in the accompanying drawings as embodied in a recorder for making a record of the operation of a radio receiving instrument. It is desirable to construct such a recorder so that it may be operatively connected temporarily to a radio receiving instrument without dismantling the receiving instrument. As illustrated in Fig. 1, the recorder R comprises a recorder tape 8 carried by mechanism adapted to move the tape at a predetermined desired rate. A stylus 7 is mounted so as to be moved to engage the tape 8 at predetermined transverse positions thereon corresponding to different radio broadcasting stations. The stylus 7 is carried by a rod 6 which is slidably mounted in a bracket 9 and is urged in one direction by a spring 10 surrounding the rod and having one end engaging the bracket 9 and its other end engaging a collar 11 fixed upon one end of the rod 6. The other end of the rod 6 is connected to one end of a steel tape 4 having its other end secured by a screw 5 upon the cylindrical surface of a disk 1. The disk 1 is mounted by a clutch embodying the invention upon the condenser shaft 2 of a radio receiving instrument. Thus, as the shaft 2 is rotated to bring the condenser of the radio receiving instrument in tune with a desired broadcasting station, the disk 1 is rotated with the shaft to cause the stylus 7 to be moved transversely of the tape 8 to a position corresponding to the broadcasting station at which the radio receiving instrument is tuned.

The disk 1 (Figs. 1, 3 and 4) is provided with a main slot 13 one wall 20 of which is provided with a groove 12 extending parallel to the axis of the disk. The wall of the groove 12 is cylindrical in form and adapted to extend more than half way around the shaft 2. The body of the disk 1 is provided with a plurality of slots 19 extending from the bottom of the groove 12 radially of the disk 1. The width of the passage from the slot 13 into the groove 12 is less than the diameter of the shaft 2. Thus, when the shaft 2 is positioned in this passage as shown in Fig. 4, the body of the disk is sprung to increase the size of this passage and the groove 12, thereby permitting the shaft to be seated in the groove 12 as shown in Fig. 3. When the shaft 2 is in the position shown in Fig. 3, it may be said that the portions 25, 26 and 27 of the bottom of the groove 12 serve as a seat for the shaft 2 and the portion 28 of the surface of the groove 12 serves as a resilient member to hold the shaft upon its seat with sufficient force to permit the disk 1 to rotate with the shaft 2 and move the stylus 7 (Fig. 1).

In Fig. 2 the stylus 7' of the recorder R' is connected to one end of a Bowden wire 16 the other end of which is held in engagement with the surface of a cam 15 by a spring 10. The cam is mounted upon the condenser shaft 2' of the radio receiving instrument by another clutch construction embodying the invention. The cam 15 (Figs. 2, 5 and 6) comprises a body having a slot 13', one wall of which is provided with a groove 31. The width of the slot 13' is greater than the diameter of the shaft 2'. The bottom surface of the groove 31 is cylindrical in form and is adapted to extend not more than half way around the shaft 2' and serve as a seat for the latter. A steel spring 14 is secured in the body of the cam 15 so as to extend into the slot 13' as shown in Fig. 6. As the shaft 2' is moved from the position shown in Fig. 6 to the full line position shown in Fig. 5, the spring 14 is deflected to cause a force to be stored therein tending to hold the shaft 2' and its seat 31 in engagement. The spring 14 is provided with a sharp edge 32 tending to bite into the shaft 2' and prevent relative rotation of the cam 15 and shaft 2'. The resistance to relative rotation of the cam 15 and shaft 2' in the direction of the arrow in Fig. 5 is greater than the resistance to relative rotation in the opposite direction. It will be noted that the dotted line 1 (Fig. 5), representing a plane through the line of engagement between the surface of the shaft 2' and the sharp edge 32 and through the line of intersection of the wall 20 of the slot 13' and the groove 31 is on the side of the axis of the shaft opposite the seat 31 and, consequently, the force of the spring 14 tends to hold the seat 31 and shaft 2' in engagement.

In the further modification shown in Figs. 7 and 8, the spring actuated plunger 18 replaces the spring 14 shown in Fig. 5. The plunger 18 is slidably mounted in a cavity 34 in the body 37, which may be a cam or other mechanical element. The cavity 34 opens into the slot 13". This cavity has an enlarged intermediate portion 35 in which an enlarged section 36 of the plunger 18 is slidably mounted. A spring 17 is interposed between the plunger 18 and the bottom of the cavity 34. As the shaft 2" is moved from the position shown in Fig. 8 to the full line position shown in Fig. 7, the plunger 18 is depressed, compressing the spring 17 to cause a force to be stored therein tending to urge the plunger 18 against the shaft 2", thus holding the shaft 2" and its seat 31' in engagement. The plunger 18 is provided with a sharp edge 33 tending to bite into the shaft 2" and prevent relative rotation of the body 37 and the shaft 2". The resistance to relative rotation of the body 37 and the shaft 2" in the direction of the arrow in Fig. 7 is greater than the resistance to relative rotation in the opposite direction.

I claim:

1. A clutch adapted to be detachably mounted upon an arbor by movement transversely thereof, said clutch including a rigid body having a slot, one of the side walls of said slot having a cavity providing a seat for said arbor, and resilient means normally projecting from the bottom of said slot to be engaged and compressed by said arbor as the latter approaches said seat and to exert a resilient force acting on said arbor in a direction toward said seat to hold the arbor in engagement with the seat and permit power to be transmitted from said arbor through said clutch.

2. A clutch adapted to be detachably mounted upon an arbor by movement transversely thereof, said clutch including a rigid body having a slot to receive said arbor, one of the side walls of the slot adjacent the bottom thereof having a cavity providing a seat for said arbor, said seat being spaced from the opposite side wall of the slot, and resilient means projecting upwardly through the bottom of the slot so as to be engaged and compressed by said arbor as the latter approaches said seat and to exert a resilient force acting on said arbor in a direction toward said seat to hold the arbor in engagement with the seat and permit power to be transmitted from said arbor through said clutch, said resilient means having a sharp edge tending to bite into the surface of the arbor when the latter engages said seat to resist relative rotation of the clutch and arbor in one direction and to maintain the arbor spaced from the wall of the slot opposite said cavity.

LOUIS FRANK WOODRUFF.